United States Patent
Surprenant

(10) Patent No.: US 10,161,531 B2
(45) Date of Patent: Dec. 25, 2018

(54) DUST AND ABRASIVE MATERIALS GATE VALVE WITH AN ANGLED VALVE SEAT

(71) Applicant: Plattco Corporation, Plattsburgh, NY (US)

(72) Inventor: Dean Surprenant, Mooers, NY (US)

(73) Assignee: Plattco Corporation, Plattsburgh, NY (US)

(*) Notice: Subject to any disclaimer, the term of this patent is extended or adjusted under 35 U.S.C. 154(b) by 48 days.

(21) Appl. No.: 15/167,252

(22) Filed: May 27, 2016

(65) Prior Publication Data
US 2017/0037977 A1     Feb. 9, 2017

Related U.S. Application Data

(60) Provisional application No. 62/201,068, filed on Aug. 4, 2015.

(51) Int. Cl.
| | |
|---|---|
| *F16K 3/18* | (2006.01) |
| *F16K 3/14* | (2006.01) |
| *F16K 3/04* | (2006.01) |
| *F16K 3/02* | (2006.01) |

(52) U.S. Cl.
CPC .............. *F16K 3/18* (2013.01); *F16K 3/0218* (2013.01); *F16K 3/04* (2013.01); *F16K 3/14* (2013.01)

(58) Field of Classification Search
CPC . F16K 3/18; F16K 3/14; F16K 3/0218; F16K 3/04; F16K 3/08; F16K 3/085
USPC ...................... 251/326, 329, 84, 87, 88, 301
See application file for complete search history.

(56) References Cited

U.S. PATENT DOCUMENTS

| | | | |
|---|---|---|---|
| 2,833,513 A | 5/1958 | Castera | |
| 3,179,372 A | 4/1965 | Vaudreuil | |
| 3,957,245 A * | 5/1976 | Daghe | F16K 3/12 137/375 |
| 4,058,290 A | 11/1977 | Nelimarkka | |
| 4,294,427 A * | 10/1981 | Cilny | F16K 3/10 251/158 |
| 4,480,812 A * | 11/1984 | Carpentier | F16K 15/03 251/298 |
| 4,747,577 A | 5/1988 | Dimock | |
| 4,909,272 A | 3/1990 | Carpentier | |
| 4,945,949 A | 8/1990 | Carpentier | |
| 5,116,023 A | 5/1992 | Contin | |

(Continued)

OTHER PUBLICATIONS http://www.tecofi.fr/en/silo-special-knife-gate-valve/ Under Silo Special Knife Gate Valve.

*Primary Examiner* — Kevin Murphy
*Assistant Examiner* — Kelsey Cary
(74) *Attorney, Agent, or Firm* — Downs Rachlin Martin PLLC

(57) ABSTRACT

A dust and abrasive materials gate valve with an angled valve seat and pivotably mounted valve gate allows for a broad seal area around the periphery of the valve seat, which may be closed tightly by a wedging action due to increasing force applied by the valve actuator. The valve seal is thus not formed along a single, linear surface as in traditional gate valves and the force applied by the valve gate to the seat facilitates closing even if there is wear along the sealing surfaces. Due to the relatively large open area around the periphery of the valve gate just before closing or immediately upon opening, the velocity of particles in pressurized systems is reduced and erosion reduced accordingly.

17 Claims, 3 Drawing Sheets

(56) References Cited

U.S. PATENT DOCUMENTS

| | | |
|---|---|---|
| 5,241,989 A | 9/1993 | Kalavitis |
| 7,163,191 B2 | 1/2007 | Young et al. |
| 8,128,095 B2 | 3/2012 | Surprenant et al. |
| 2014/0048733 A1 | 2/2014 | Surprenant et al. |
| 2014/0231691 A1* | 8/2014 | Takeda ................. F16K 3/30 |
| | | 251/326 |
| 2016/0032676 A1 | 2/2016 | Malone et al. |

* cited by examiner

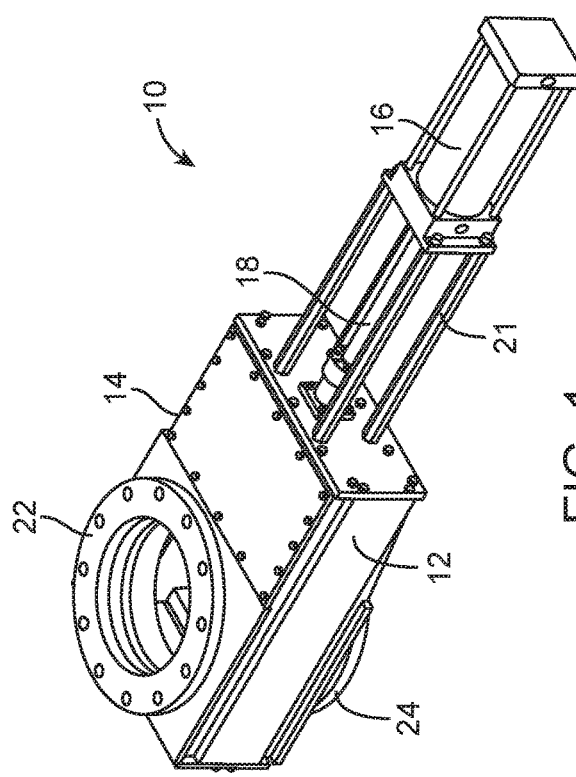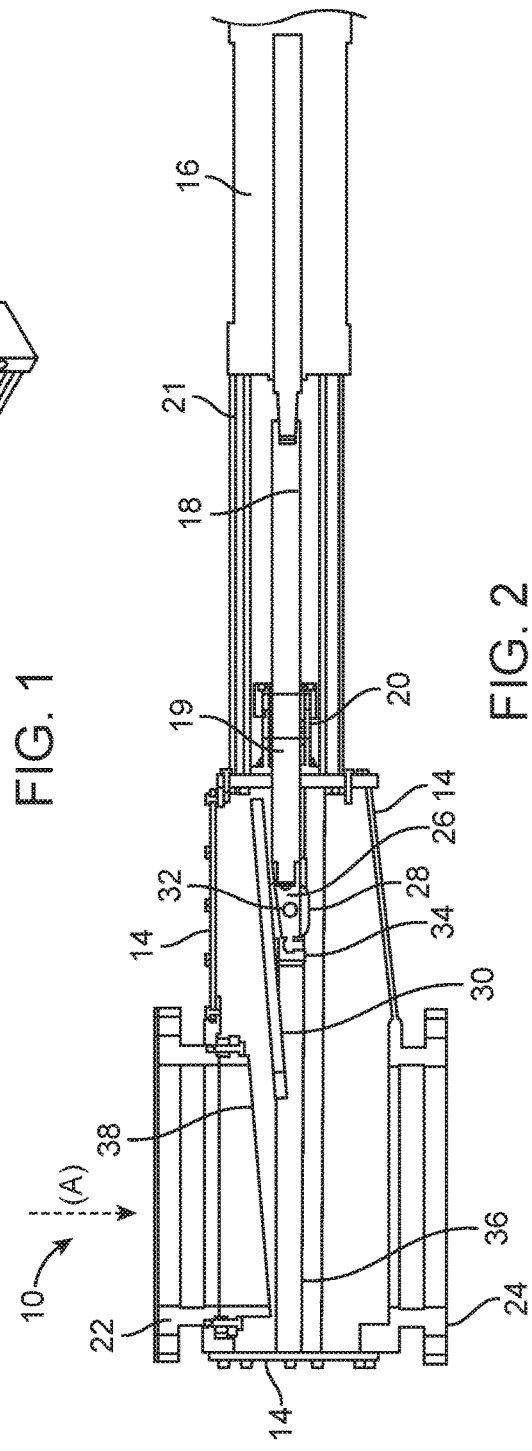
FIG. 1
FIG. 2

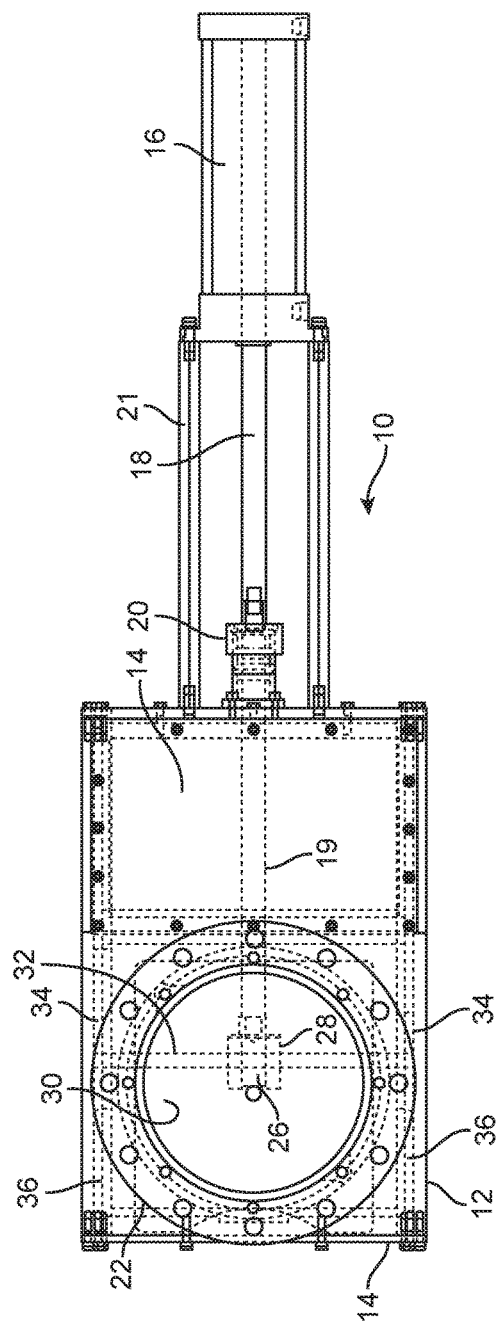
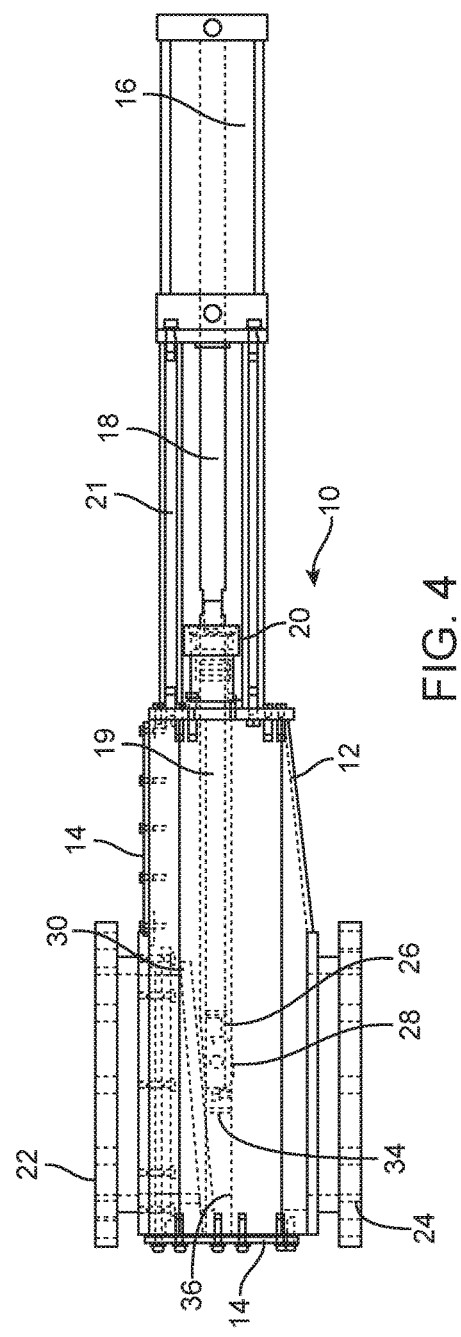
FIG. 3
FIG. 4

DUST AND ABRASIVE MATERIALS GATE VALVE WITH AN ANGLED VALVE SEAT

RELATED APPLICATION DATA

This application claims the benefit of priority of U.S. Provisional Patent Application Ser. No. 62/201,068, filed Aug. 4, 2015, and titled "Dust and Abrasive Materials Gate Valve with Angled Valve Seat," which is incorporated by reference herein in its entirety.

FIELD OF THE INVENTION

The present invention relates to dust and abrasive materials valves, and more particularly to dust and abrasive materials gate valves with angled valve seats and pivotable valve gates.

BACKGROUND

Many manufacturing processes, such as mining and minerals, cement, bulk powder, or grains and cereal production and processing, require equipment that is capable of conveying, blending, mixing, or metering solids with varying degrees of abrasive qualities. In some cases, such as in cement or mineral production, the solids can be powdered and highly abrasive. For a variety of reasons it is often necessary to quickly open or close a pipe or duct conveying such solid materials. One valve type that is well-suited to the control of such dry material processes is a flap dust valve, for example as shown in U.S. Pat. No. 5,241,989. While this type of valve can provide excellent service in such abrasive environments, it is sometimes not well-suited for use in space-limited installations. Often, gate valves must be turned to when a lower-profile valve is required.

When higher closure forces are desired, gate valves employing wedge-shaped gates, such as disclosed in U.S. Pat. No. 3,179,372, may be used. In this type of valve, the valve gate is formed in a wedge shape and the valve seat is angled on both the upstream and downstream sides of the valve to conform to the wedge-shaped gate. The wedging action created between the gate and opposed valve seats allows for higher closing forces at relatively lower gate actuation force.

While gate valves can be ideal in liquid systems, in dry materials systems, especially those involving abrasive materials, gate valves can present certain drawbacks. In particular, gate valves generally rely on a uniform leading edge to create a seal against the valve seat. However, in abrasive, dry materials systems, the gate leading edge can be subject to significant erosion as the valve gate opens and closes, which effect can be exacerbated due to increased velocity of particles when the valve is in a partly opened state before fully opening or fully closing. Once the leading edge of the gate is eroded, it can be impossible to achieve a tight seal, and leaks from an initial loss of seal only accelerate the erosion of the valve seat and sealing edge of the gate. Wedge-shaped gate valves present an additional drawback in that the downstream valve seat is directly impinged upon by the flow of dust or abrasive particles, leading to greater erosion on the downstream valve seat than the upstream valve seat. If the opposed valve seats do not remain symmetrical, the wedging action of the gate may be compromised resulting in less than a complete seal. Again, once a seal is initially compromised in an abrasive environment, it quickly deteriorates. There is thus a need for a gate-type valve with improved sealing and wear-resistance characteristics for use in dry materials processes.

SUMMARY

In one implementation, the present disclosure is directed to dust or abrasive particle valve that includes a valve body defining an upstream inlet and a downstream outlet, a single valve seat, the single valve seat formed around the upstream inlet within the valve body and lying in a plane disposed at a valve seat angle, and a valve gate translatably mounted within the valve body to translate between an open position away from the valve seat and a closed position sealed against the valve seat, wherein the valve seat angle is an acute angle with respect to the translation of the valve gate between the open and closed positions.

In another implementation, the present disclosure is directed to a gate valve for controlling flow of dust or abrasive particles, which includes a valve body defining an inlet and an outlet, a valve gate carriage translatably mounted within the valve body for translation in a translation direction, a valve seat formed around the inlet within the valve body and lying in a plane disposed at an acute angle with respect to the translation direction of the valve gate carriage, and a valve gate pivotably mounted on the valve gate carriage, the valve gate translatable from an open position away from the valve seat to a closed position on the valve seat, the valve gate pivotable on the valve gate carriage to conform to the valve seat angle in the closed position.

In yet another implementation, the present disclosure is directed to a method of controlling flow of dust or abrasive particles, which includes providing a flow of abrasive particles through a conduit along an axis of flow, translating a substantially planar closure member in a direction generally transverse to the axis of particle flow, and positioning the substantially planar closure member at an acute angle with respect to the translation direction across the conduit to seal the conduit, wherein the substantially planar closure member pivots to the acute angle during the translating.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 1 is a perspective view of one embodiment of a dust and abrasive materials gate valve as disclosed herein;

FIG. 2 is a partial cross-sectional view of the embodiment of FIG. 1;

FIG. 3 is a top view of the embodiment of FIG. 1, wherein dashed lines represent hidden lines illustrating internal components;

FIG. 4 is a side view of the embodiment of FIG. 1, wherein dashed lines represent hidden lines illustrating internal components.

DETAILED DESCRIPTION

Figure 5:
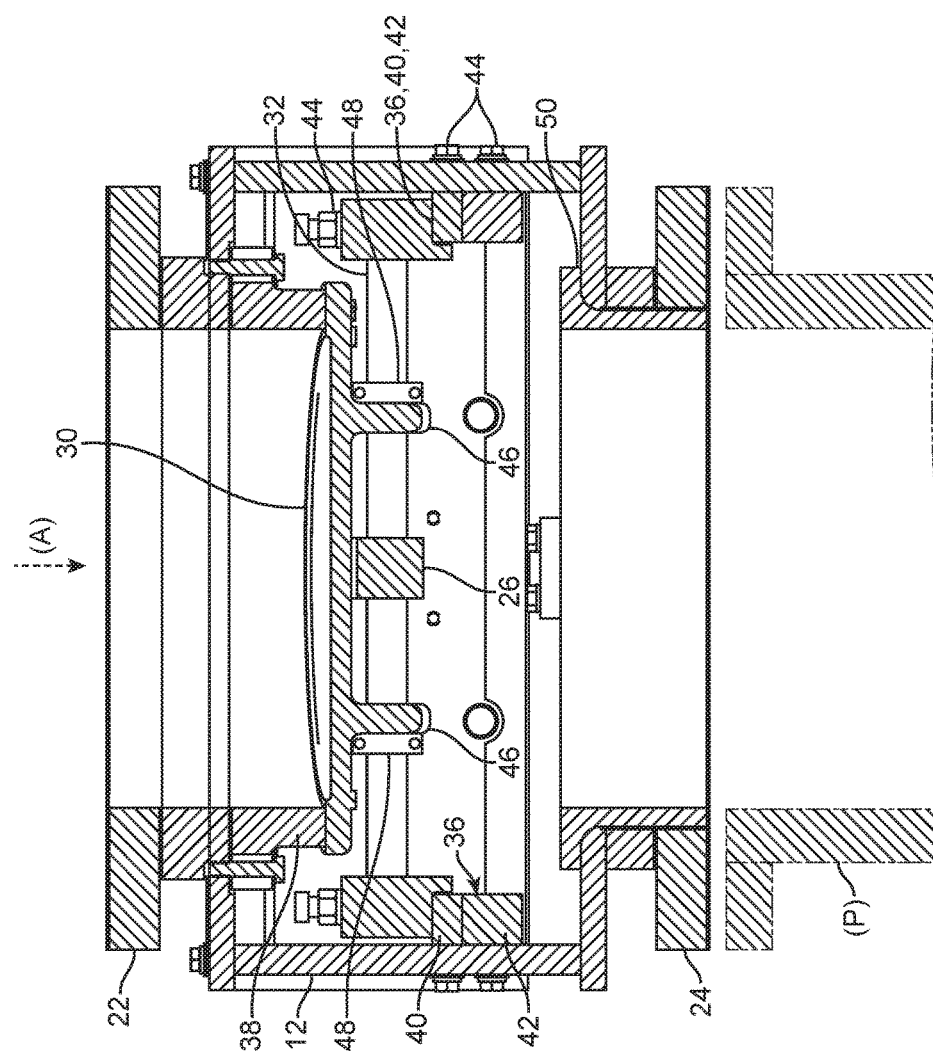
FIG. 5 is a cross-sectional, end view of an alternative embodiment of a dust and abrasive materials gate valve as disclosed herein.

Exemplary embodiments of dust and abrasive materials gate valves with angled valve seats are shown in FIGS. 1-5 and described herein. Valve 10 includes a valve body or housing 12, which is provided with removable access panels or doors 14 to facilitate access to replaceable wear components as described below. A suitable linear actuator 16, in this exemplary embodiment a hydraulic cylinder, is mounted to housing 12 to actuate the valve. Other actuator types may be employed. Piston rod 18 engages connecting rod 19 through sliding seal 20 in a wall of housing 12. Actuator supports 21 maintain position of actuator 16 relative to housing 12. Also provided with housing 12 are entry flange 22 and exit flange 24, for connection with the system piping in which valve 10 is installed. As will be later appreciated, the valve has a unidirectional arrangement such that dry materials to be controlled enter the valve through entry flange 22 and exit through exit flange 24 generally along an axis of flow (A). In most applications, valve 10 will be installed with the axis of flow (A) oriented in a substantially vertical direction. The valve body or housing will thus typically be configured to accommodate mounting with such an orientation.

A rod end fitting or tang 26 is provided at the end of connecting rod 19, opposite piston rod 18. Clevis 28 is fixed to the bottom of valve gate 30, with tang 26 received therein to provide a pivotable connection. Support rod 32 extends through tang 26 and clevis 28 to provide the pivotable connection. Support rod 32 is captured at each end within guide shoes 34. Tang 26, clevis 28, and support rod 32 generally comprise a translatable carriage for the valve gate, carried by shoes 34 riding on or in slides 36, which may comprise rails or channels formed in or, more preferably, removably mounted along the side walls of housing 12. Typically, the direction of translation will be in a substantially horizontal orientation, in other words, substantially perpendicular with respect to axis of flow (A). Valve seat 38 is provided at an acute angle relative to the approach of gate 30 such that gate 30 pivots into place around rod 32 and seals around the full periphery of the valve seat in response to the closing force applied by actuator 16. In certain applications, the angle of valve seat 38 may be approximately 10° to approximately 20° with respect to the direction of sliding motion of valve gate 30 along the path provided by slides 36. In other embodiments, valve seat 38 may be angled at approximately 15°.

As valve gate 30 is advanced onto valve seat 38 via force of actuator 16, a relatively broad seal area is presented around the periphery of seat 38, which may be closed more tightly by a wedging action due to increasing force applied by actuator 16. The valve seal is thus not formed along a single, linear surface as in a traditional gate valve and the force applied by the valve gate to the seat facilitates closing even if there is wear along the sealing surfaces. Leaks that lead to increased erosion of the valve seat are thus reduced or eliminated. Further, due to the relatively large open area around the periphery of the valve gate just before closing or immediately upon opening, the velocity of particles in pressurized systems is reduced and erosion reduced accordingly. While the design of the valve thus described provides for good sealing properties with metal-to-metal contact between the valve seat and valve gate, in some instances it may be desirable to add a resilient material around the valve seat to further increase sealing characteristics for specific applications. Wear resistant resilient materials such as abrasion resistant neoprene linings (for example, Endura-flex™ 713) may be employed as sealing gaskets around valve seat 38 in some embodiments.

In one embodiment as illustrated in FIG. 5, slides 36 are formed as two part rails comprising upper, removable wear bar 40 supported by base rail 42. In this embodiment, both wear bar 40 and base rail 42 are separately bolted to the housing wall by through-bolts 44. In a further alternative illustrated in FIG. 5, gate 30 is supported on rod 32 by peripheral ears 46, which may be attached to or integrally formed with the gate, and the location of gate 30 on rod 32 is maintained by shaft collars 48 positioned against the outside of each peripheral ear 46. With this arrangement, instead of central clevis 28, rod 32 passes through rod end fitting 26, which is not attached to the gate. Also illustrated is optional removable outlet liner 50 positioned within exit flange 24. Exemplary attachments to materials transport system or conduits, such as a piping system (P), is also illustrated in phantom lines in FIG. 5.

Based on the teachings provided herein, and as will be appreciated by persons skilled in the art, valve 10 may be constructed as described with a relatively low profile. For example, in an illustrative embodiment, with 12" diameter entry and exit flanges, the height between the mounting faces of entry flange 22 and exit flange 24 may be in the range of about 5-15½".

Further alternative features and/or advantages of disclosed embodiments include pivot rod 32 being offset from the centerline of gate 30 in a direction towards actuator 16 in order to facilitate material sliding off of the gate during closing to reduce accumulation of material on the gate as it is seated against the valve seat. In an exemplary embodiment, pivot rod 32 is offset approximately 1¼" from the valve seat/gate centerline. Shoes 34 also may be provided with tapered leading and trailing edges (see hidden lines in FIG. 3 plan view) to help clear material that may accumulate in slides 36.

In general, components of valve 10 not subjected to excessive wear conditions, such as housing 12 and flanges 22, 24 may be constructed of suitable grade steel or alloys consistent with operating plant requirements. Components of valve 10 subjected to potentially excessive wear conditions due to impingement of flowing materials may be constructed of wear-resistant materials such as Ni-Hard, ceramic or a wear resistant rubber. Further, such wear components, including, in particular, valve gate 30, shoes 34, slides 36 (or wear bars 40), valve seat 38 or outlet liner 50 may be mounted, such as by bolting, to facilitate removal and replacement through access doors 14 such that valve 10 may be serviced and wear components replaced in situ with minimal system down time. For these reasons such components may be specifically configured and dimensioned in combination with the access doors to permit removal and replacement without need for removing the valve as a whole from the conduits or piping system (P) in which the valve is placed.

The foregoing has been a detailed description of illustrative embodiments of the invention. References to an angle formed between a line (or direction) and a plane refer to the angle between the line and its orthogonal projection onto the plane. It is noted that in the present specification and claims appended hereto, conjunctive language such as is used in the phrases "at least one of X, Y and Z" and "one or more of X, Y, and Z," unless specifically stated or indicated otherwise, shall be taken to mean that each item in the conjunctive list can be present in any number exclusive of every other item in the list or in any number in combination with any or all other item(s) in the conjunctive list, each of which may also be present in any number. Applying this general rule, the conjunctive phrases in the foregoing examples in which the conjunctive list consists of X, Y, and Z shall each encompass: one or more of X; one or more of Y; one or more of Z; one or more of X and one or more of Y; one or more of Y and one or more of Z; one or more of X and one or more of Z; and one or more of X, one or more of Y and one or more of Z.

Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve aspects of the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present disclosure.

The invention claimed is:

1. A dust or abrasive particle valve, comprising:
a valve body defining an upstream inlet and a downstream outlet;
a single valve seat, said single valve seat formed around the upstream inlet within the valve body and lying in a plane disposed at a valve seat angle; and
a valve gate translatably mounted within the valve body to translate between an open position away from the valve seat and a closed position sealed against the valve seat, wherein the valve seat angle is an acute angle with respect to the translation of the valve gate between the open and closed positions;
wherein the valve gate is a substantially planar member pivotably mounted to conform to said valve seat angle in said closed position;
wherein the valve gate is pivotably mounted at a point offset from the valve gate center along an axis along which the valve gate translates in a direction towards the open position, and the valve gate being mounted a sufficient distance from the downstream outlet to permit pivoting to release dust or particles lying on the valve gate without interference with the downstream outlet when moving between the open and closed positions; and
wherein the valve body is configured to be mounted with the valve gate translating in a substantially horizontal orientation.

2. The valve of claim 1, further comprising a valve gate carriage translatably disposed within the valve body with the valve gate pivotably mounted on said valve gate carriage.

3. The valve of claim 2, further comprising:
slides mounted in or on opposite internal side walls of the valve body; and
a removable shoe riding on or in each slide, wherein the valve gate carriage is mounted on said shoes and each said shoe has at least one angled end to clear material accumulated on or in said slides during said translation of the valve gate carriage between the open and closed positions.

4. The valve of claim 3, wherein said slides comprise two part rails removably attached to the valve body side walls, one part of said two part rails being a removable wear surface.

5. The valve of claim 1, wherein the valve seat angle is approximately 10° to approximately 20°.

6. The valve of claim 1, further comprising a linear actuator extending through a sealed opening in the valve body and cooperating with the valve gate to effect said translation between the open and closed positions.

7. A gate valve for controlling flow of dust or abrasive particles, comprising:
a valve body defining an inlet and an outlet;
a valve gate carriage translatably mounted within the valve body for translation in a translation direction, wherein said valve body is configured to be mounted with the valve gate translating in a substantially horizontal orientation substantially perpendicular to a direction of particle flow in a substantially vertical direction;
a valve seat formed around said inlet within the valve body and lying in a plane disposed at an acute angle with respect to the translation direction of the valve gate carriage;
a valve gate pivotably mounted on the valve gate carriage, the valve gate translatable from an open position away from the valve seat to a closed position on the valve seat, the valve gate pivotable on the valve gate carriage to conform to said valve seat angle in said closed position; and
a valve gate actuator configured to impart motion to translate said valve gate and valve gate carriage;
wherein the valve gate is pivotably mounted on the valve gate carriage at a point offset from the center of the valve gate along a direction of travel of the valve gate in a direction towards the open position.

8. The gate valve of claim 7, further comprising:
slides mounted in or on opposite internal side walls of the valve body; and
a shoe riding on or in each slide, wherein the valve gate carriage is mounted on said shoes and each said shoe has at least one angled end to clear material accumulated on or in said slides during said translation between the open and closed positions.

9. The gate valve of claim 8, wherein said slides comprise two part rails removably attached to the valve body side walls, one part of said two part rails being a removable wear surface.

10. The gate valve of claim 7, wherein said acute angle is approximately 10° to approximately 20°.

11. The gate valve of claim 7, wherein said valve gate actuator comprises a linear actuator configured to apply a force to translate the valve gate carriage, wherein said applied force includes a force component applied through said valve gate to said valve seat in a direction normal to the plane of the valve seat.

12. A method of controlling flow of dry, abrasive materials comprising dust or abrasive particles, said method comprising:
providing a flow of said dry abrasive materials through a conduit along an axis of flow;
translating a substantially planar closure member in a direction generally transverse to the axis of said dry abrasive materials flow; and
positioning the substantially planar closure member at an acute angle with respect to the translation direction across the conduit to seal the conduit, wherein the substantially planar closure member pivots to said acute angle during said translating;

wherein the direction of translating of said planar closure member is substantially horizontal, said planar closure member pivots at a point offset from a center of said member along the direction of translating, and said axis of flow is oriented in a substantially vertical direction.

13. The method of claim 12, wherein said positioning comprises sealing substantially all points around a periphery of the conduit at substantially the same time.

14. The method of claim 12, comprising applying a closing force to the planar closure member along the translation direction, said applying comprising applying a force component in a direction perpendicular to said acute angle to force the closure member against the conduit.

15. A dry, abrasive materials valve, comprising:
   a valve body defining an upstream inlet and a downstream outlet;
   a single valve seat, said single valve seat formed around the upstream inlet within the valve body and lying in a plane disposed at a valve seat angle;
   a valve gate carriage horizontally translatably disposed within the valve body;
   a valve gate pivotably mounted on said valve gate carriage to translate with said valve gate carriage within the valve body between an open position away from the valve seat and a closed position sealed against the valve seat,
   slides mounted in or on opposite internal side walls of the valve body; and
   a removable shoe riding on or in each slide, wherein the valve gate carriage is mounted on said shoes and each said shoe has at least one angled end to clear particles of dry abrasive material accumulated on or in said slides during said translation between the open and closed positions;
   wherein the valve seat angle is an acute angle with respect to the translation of the valve gate between the open and closed positions; and
   wherein the valve gate is pivotably mounted on the valve gate carriage at a point offset from the center of the valve gate along a direction of travel of the valve gate carriage in a direction towards the open position to facilitate material sliding off of the valve gate during closing to reduce accumulation of material on the gate as it is seated against the valve seat.

16. The valve of claim 15, wherein said slides comprise two part rails removably attached to the valve body side walls, one part of said two part rails being a removable wear surface resistant to wear by dry abrasive materials.

17. The valve of claim 15, wherein said valve gate, shoes, slides and valve seat are constructed of a material resistant to wear by impingement of flowing dry and abrasive materials, and are each separate components from the valve body, removably mounted and configured for individual replacement.

* * * * *